United States Patent [19]
Nakagaki et al.

[11] Patent Number: 5,295,671
[45] Date of Patent: Mar. 22, 1994

[54] VIBRATION INSULATING MOUNT

[75] Inventors: Osamu Nakagaki; Tatsuo Suzuki, both of Inazawa, Japan

[73] Assignee: Toyoda Gosei Co., Ltd., Nishikasugai, Japan

[21] Appl. No.: 969,054

[22] Filed: Oct. 30, 1992

[30] Foreign Application Priority Data

Nov. 6, 1991 [JP] Japan .................. 3-290037

[51] Int. Cl.$^5$ .................. F16F 13/00; B60K 5/12
[52] U.S. Cl. .................. 267/140.13; 248/562; 248/638
[58] Field of Search .................. 248/573, 562, 638; 267/141, 153, 140.13, 219

[56] References Cited

U.S. PATENT DOCUMENTS

| | | | |
|---|---|---|---|
| 4,946,147 | 8/1990 | Katao et al. | 267/140.13 |
| 5,178,374 | 1/1993 | Maemo | 248/562 X |

FOREIGN PATENT DOCUMENTS

| | | | |
|---|---|---|---|
| 60-18633 | 1/1985 | Japan | 267/140.13 |
| 3-144134 | 6/1991 | Japan | 267/140.13 |
| 4-46240 | 4/1992 | Japan . | |

Primary Examiner—Douglas D. Watts
Attorney, Agent, or Firm—Cushman, Darby & Cushman

[57] ABSTRACT

A vibration insulating mount is provided having a flanged body. A rubber body covers flanges provided at both ends of the flanged body, thereby defining a lower support and an upper support. A stopping section of an upper case is provided which has a clearance hole. The hole is the same plan shape as the upper support and is slightly larger than the supper support. The mount is constructed so that when the upper case is fixed to the rubber body, postures of the clearance hole and the upper support are conformed. The mount is further constructed so that the upper support may passed through the clearance hole and the upper case 37 can be rotated and fixed to the rubber body 31. Thus, the upper case is prevented from interfering with the upper support, so that the stopping section is disposed between the supports and opposed thereto so as to touch any one of the supports, upon elastic deformation of the rubber body. A method of assembling an insulating mount is also provided.

15 Claims, 5 Drawing Sheets

VIBRATION INSULATING MOUNT

BACKGROUND OF THE INVENTION

1. Field of the Invention

This invention relates to a vibration insulating mount, particularly to a vibration insulating mount which has a stopper device to prevent elastic deformation beyond its bounds upon an excessive external force.

2. Description of Related Art

Figure 9:
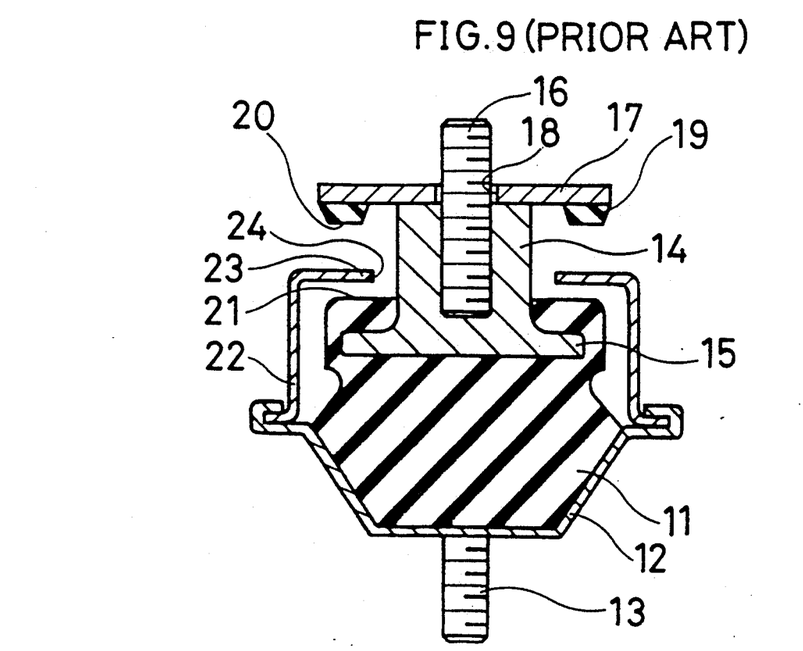
FIG. 9 is a cross sectional view showing an engine mount of related art.

A vibration insulating mount is shown in FIG. 9, which is an engine mount used for bearing the load of an engine of a vehicle.

FIG. 9 illustrates a section of the engine mount. As shown in the figure, the engine has a rubber body 11. A lower case 12 is fixed to a lower surface of the rubber body 11. The lower case 12 is made of a metal and formed into a cup shape that is opened upward. A lower attaching bolt 13 is projected downward from a lower surface of the lower case 12. A flanged body 14, has a lower flange 15 embedded in an upper part of the rubber body 11. The flanged body 14 protrudes upwardly from inside the rubber body 11. An upper attaching bolt 16 is projected upward from an upper surface of the flanged body 14. The lower case 12 and the flanged body 14 are formed into one body in a curing process of the rubber body 11.

A disc fitting plate 17 has a tapped hole 18 formed at its center and fitted on the upper attaching bolt 16 so as to be disposed upon the upper surface of the flanged body 14. A rubber ring 19 is cured and molded onto a lower surface of the fitting plate 17 about its circumference. A lower surface of the rubber ring 19 constitutes an upper support 20, while a troidal upper surface of the rubber body 11 constitutes a lower support 21. Both the supports 20 and 21 are opposed to each other by a fixed distance.

A cylindrical upper case 22 formed of a metal plate is arranged on an outer periphery of the rubber body 11. The upper case 22 has its entire lower end bent outwardly so as to enqage an outer periphery of the lower case 12. The outer periphery of the lower case 12 is caulked while covering the lower end of the upper case 22, so that both these cases 12 and 22 are made integral. An overall upper end of the upper case 22 is bent inwardly so as to define a circular clearance hole 24 at its center. An inner edge of the clearance hole 24 surrounds an outer peripheral surface of the flanged body 14 with a space therebetween. This upper bent section of the upper case 22 is used as a stopping section 23. The stopping section 23 is positioned between the upper support 20 and the lower support 21. As clearly shown in the figure, an inner diameter of the stopping section 23 is set smaller than an outer diameter of the upper and lower supports 20 and 21. Thus, the upper support 20 is struck on an upper surface of the stopping section 23, when the rubber body 11 is contracted. On the other hand, the lower support 21 is struck on a lower surface of the stopping section 23, when the rubber body is expanded.

Here, the stopping section 23 is not placed at a middle position between the supports 20 and 21, but is disposed at a position slightly lower than that, since a weighing down length of the rubber body 11 is taken into account, due to the weight of an engine. When the engine is put on the engine mount, the rubber body 11 is pressed so that the supports 20 and 21 move downward, thereby placing the stopping section 23 at a middle position.

As described above, the engine mount has a detachable fitting plate 17 provided on the flanged body 14. This is because, if the fitting plate 17 is fitted on the flanged body 14 before the upper case 22 is assembled on the lower case 12, the stopping section 23 interferes with the fitting plate 17, thereby making the assembly impossible. In order to remove such troubles, the engine mount adopts a structure such that the upper case 22 is assembled while the fitting plate 17 is detached.

Next, an operation of the above constructed engine mount is described. In an assembled state in a car, the engine mount has the lower attaching bolt 13 secured in an engine room of a car body (not shown). The upper attaching bolt 16 is fixed to a mounting bracket or the like of an engine block. Thus, the engine is supported on the car body via the engine mount. The fitting plate 17 is held and secured between the flanged body 14 and the mounting bracket or the like of the engine. When vibration is applied to the upper attaching bolt 16 in operating the engine, the vibration is transmitted from the upper attaching bolt 16 to the rubber body 11 via the flanged body 14. The rubber body 11 is thereby elastically deformed to dampen the vibration.

Moreover, in case a mechanical shock is applied to the car body in running the car, e.g. in off-road driving, or when a rapid change of a load on the engine takes place, the engine mount is exposed to internal forces much larger than forces of normal vibration of the engine. Then, in the engine mount, the rubber body 11 cannot be deformed enough to absorb the external force. For instance, when the external force is applied in a contracting direction, the rubber body 11 is contracted vertically, so that the upper support 20 is contacted with the upper surface of the stopping section 23. Subsequently, the rubber body 11 is prevented from further deformation, thereby avoiding breakage due to excessive contraction. When the external force is applied in an expanding direction, the rubber body 11 is expanded vertically, so that the lower support 21 is contacted with the lower surface of the stopping section 23. Subsequently, the rubber body 11 is prevented from breaking due to excessive expansion.

As mentioned above, the engine mount has the fitting plate 17 assembled as a separate member from the rubber body 11 and the flanged body 14. Thus, an extra manufacturing step for the fitting plate 17 is necessary, e.g. steps for molding the fitting plate 17, or curing and molding and coating adhesive on the rubber ring 19. This causes an increase of total manufacturing costs of the engine mount.

Moreover, the fitting plate 17 is detachably disposed on the engine mount and fixed just when the engine mount is set on the car body. Consequently, it is possible that the fitting plate 17 will drop out in the previous steps. Accordingly, manufacturing needs to be carried out while taking care of such possible drop-out, making the work troublesome.

SUMMARY OF THE INVENTION

In view of the above, it is an object of the invention to provide a vibration insulating mount that reduces the number of parts so as to decrease the number of manufacturing steps so that production costs are minimized and that manufacturing work is easily facilitated.

In accordance with one preferred mode of the invention, there is provided a vibration insulating mount that has an elastic body which is elastically deformed upon application of vibration of the vibrating body. A first support is provided on one portion of the elastic body. A second support is provided away from the elastic body by a fixed distance relative to the first support. A stopper is disposed at another portion of the elastic body. The stopper has at one end thereof, a stopping section which is disposed between the first support and the second support. The stopping section is constructed such that, in assembling, it avoids interference with the second support during movement relative to the second support. The stopping section is also structured such that, after assembly, it is contacted with any one of the first support and the second support so as to further regulate elastic deformation of the elastic body when the elastic body is deformed more than a predetermined degree.

It is a further object of the invention to provide a method of easily assembling a vibration insulating mount.

Further objects and advantages of the invention will be apparent form the following description, reference being made to the accompanying drawings, wherein preferred embodiments of the invention are clearly shown.

DETAILED DESCRIPTION OF THE PREFERRED EMBODIMENTS

Referring to the drawings, wherein like reference characters designate like or corresponding parts throughout the several views, embodiments of the invention will be described hereafter.

Figure 1:
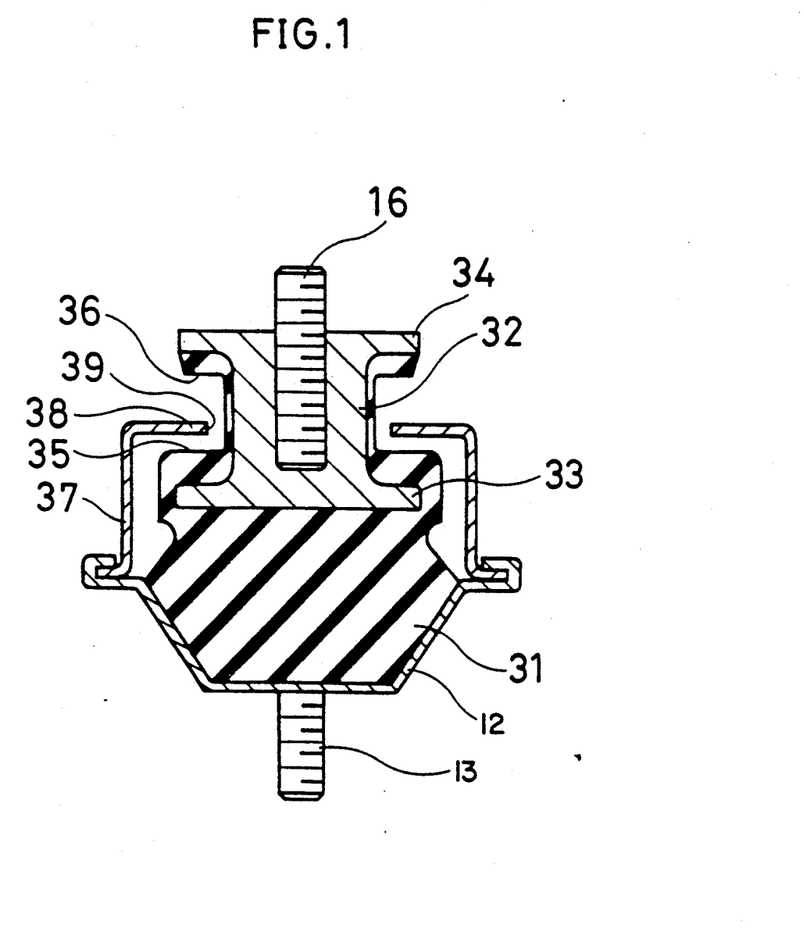
FIG. 1 is a cross sectional view shown a first embodiment of an engine mount of the invention.
Figure 2:
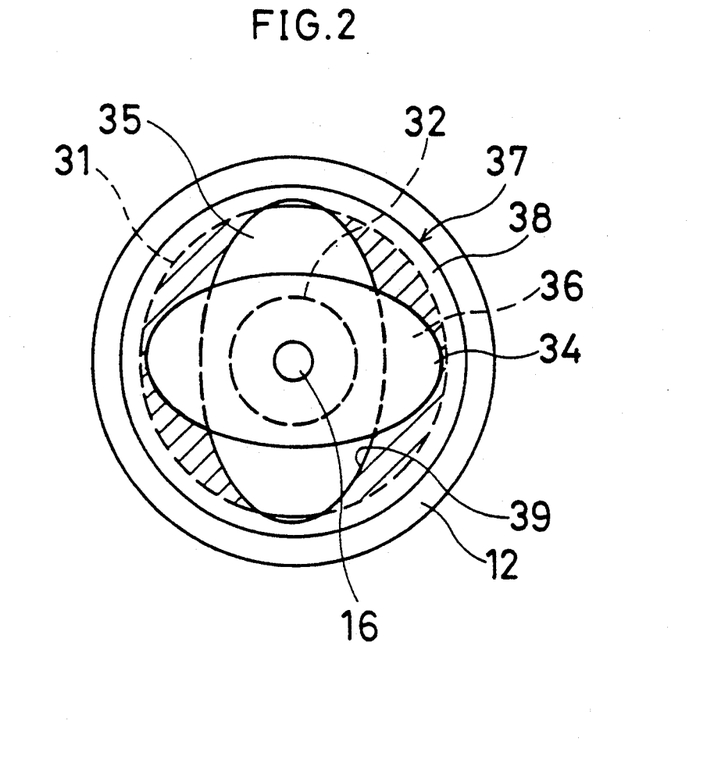
FIG. 2 is a plan view showing a first embodiment of an engine mount of the invention, provided with hatching for clarity.

FIG. 1 illustrates a section of a first embodiment of an engine mount of the invention. FIG. 2 shows a plan view of the first embodiment of the engine mount. The present embodiment of the engine mount has some structures similar to the engine mount of the related art. Therefore, the present embodiment will be explained particularly emphasizing differences therebetween.

A rubber body 31 has a cross section shown in FIG. 1. The rubber body 31 is elastically vertically deformed upon application of vibration of an engine. As shown in the figure, the present embodiment of the engine mount eliminates the fitting plate 17 and the rubber ring 19 of the engine mount of the related art. An upper flange 34 is integrally molded on an upper part of a flanged body 32. As illustrated in FIG. 2, the upper flange 34 has an elliptical plan shape. A lower flange 33 has a circular plan shape as in the engine mount of the related art. The flanged body 32 is embedded inside or covered with the rubber body 31 wholly from the lower flange 33 to a lower surface of the upper flange 34. The rubber body 31 has a small thickness at a portion where it covers the flanged body 32. Thus, as shown in FIG. 1, an upper part of the rubber body 31 has a double-flanged shape following a shape of the flanged body 32. The rubber body 31 has an elliptical outline at a place where it covers the lower surface of the upper flange 34. This area of the rubber body 31 defines an upper support 36. The rubber body 31 has a circular outline at a place where it covers the upper surface of the lower flange 33, as in the engine mount of the related art. This part of the rubber body 31 defines a lower support 35. The upper support 36 is opposed to the lower support 35 with a fixed distance. An indentation 55 is defined between the upper support 36 and the lower support 35.

An upper case 37 is disposed from above onto the rubber body 31 in a surrounding manner, and is able to be horizontally rotated 90 degrees from this position and secured by caulking. Namely, a stopping section 38 of a stopper 37 has a clearance hole 39 at its center. The shape of the clearance hole 39 is not circular like the clearance hole 24 of the engine mount of the related art, but instead is elliptical and of the same shape as the upper flange 34 and is slightly larger than the upper flange 34. The elliptical clearance hole 39 is adapted to be disposed at a right angle to the elliptical upper flange 34. Thus, there are defined some portions where the stopping section 38 and the lower support 35 are faced to each other or overlapped when seen from above: two large crescent portions as shown by unidirectional hatching in FIG. 2. Moreover, there are defined some portions where the stopping section 38 and the upper support 36 are faced to each other: two small semi-circular portions shown by bi-directional hatching in FIG. 2. That is, in the present embodiment, the stopping section 38 is provided on the upper case 37. Thus, when the upper case 37 is disposed around the rubber body 31, the stopping section 38 can be positioned between the upper support 36 and the lower support 35 while avoiding interference with the upper support 36. Then, the stopping section 38 is opposed respectively to the supports 35 and 36 according to its relative rotation. Thereby, when the rubber body 31 is elastically deformed, the stopping section 38 is contacted with any one of the supports 35 and 36 so as to regulate further elastic deformation of the rubber body 31.

In the present embodiment, the rubber body 31 constitutes an elastic body. The lower support 35 constitutes a first support. The upper support 36 constitutes a second support. The upper case constitutes a stopper.

Figure 3:
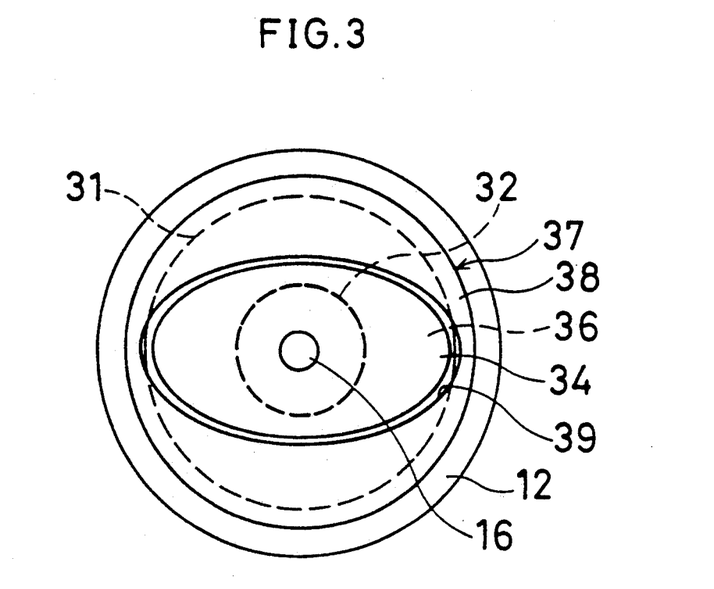
FIG. 3 is a plan view showing a first embodiment of an engine mount of the invention at a point in assembly.

The assembling steps of the engine mount constructed as above are described below. FIG. 3 shows a plan view of the first embodiment of the engine mount that is being assembled.

The lower case 12 and the flanged body 32 are made into one body in a curing process of the rubber body 31, like the engine mount of the related art. However, in the present embodiment of the engine mount, the upper flange 34 has already been molded on the flange body 32 at the time of the curing process. Moreover, the flange body 32 is also covered with the rubber body 31 at the time of the curing process so as to form the upper support 36. Namely, in order to make up a unified structure of the rubber body 31 and the flanged body 32 with the upper flanged 34 and the upper support 36, only the curing and molding step is needed in the present embodiment. In other words, any additional steps are unnecessary in order to obtain such unified structure in the present embodiment, although additional steps are needed to obtain the upper support 20 in the related art.

At this time, the lower attaching bolt 13 and the upper attaching bolt 16 have been already secured to the lower case 12 and the flanged body 32, respectively. Consequently, only a fixing step to the upper case 37 is necessary to be completed thereafter. Then, as shown in FIG. 3, the elliptical hole 39 corresponds to the elliptical upper flange 34 of the flanged body 32, and the upper case 37 is disposed so as to cover the rubber body 31 from its upper side. Thus, the clearance hole 39 of the upper case 37 permits the upper flange 34 to pass therethrough, and is positioned between the upper support 36 and the lower support 35. In this state, the upper case 37 is horizontally rotated 90 degrees. Thus, the stopping section 38 makes the two large crescent portions opposed to the lower support 35, as shown by the unidirectional hatching in FIG. 2. At the same time, the stopping section 38 makes the two small semicircular portions opposed to the upper support 36, as shown by the bi-directional hatching in FIG. 2. While kept in this position, the upper case 37 is fixed by caulking to the lower case 12, and the assembly of the engine mount is completed.

When the engine mount is fitted to the car, it dampens engine vibration by elastic deformation of the rubber body 31. When a large external force is applied thereto, the upper support 36 or the lower support 35 is contacted with the stopping section 38 of the upper case 37, following the vertical contracting and expanding movement of the rubber body 31, thereby preventing breakage of the rubber body 31 due to its excessive elastic deformation.

As mentioned above, in the present embodiment of the engine mount, the upper flange 34 of the flanged body 32 is elliptical and the clearance hole 39 of the upper case 37 is an ellipse of the same shape as the upper flange 34 and is slightly larger than the upper flange 34. Therefore, the upper case 37 can be disposed on the rubber body 31 while making same the postures of the clearance hole 39 and the upper flange 34. Moreover, if the upper case 37 is rotated 90 degrees along with the clearance hole 39, the stopping section 38 can be faced to the upper support 36 and function as a stopper device upon application of large external force. As a result, even though the upper flange 34 and support 36 are unified with the rubber body 31 and flanged body 32, the upper case 37 can be fixed without any troubles.

Accordingly, it is unnecessary to separately construct the fitting plate 17 and the rubber ring 19, so that there is no need for any extra manufacturing steps for such members 17, 19. Moreover, the upper flange 34 as an alternative to the fitting plate 17 is simultaneously molded with the flanged body 32, so that no special manufacturing steps are required. Furthermore, the upper support 36 as an alternative to the rubber ring 19 is molded at the time of the curing and molding of the rubber body 31, so that any particular assembly steps are not required.

As a result, there is no possibility that the number of steps will increase due to the unification of the parts 34 and 36. Therefore, all the manufacturing steps for the parts 17 and 19 can be eliminated, thereby decreasing the number of manufacturing steps, so that total production costs of the engine mount can be greatly diminished. There is no concern that the upper flange 34 and the upper support 36 will drop out before fitting to the car body in the manufacturing steps of the engine mount, since they are integrated with the rubber body 31 and the flanged body 32. As a result, there is no need to prevent the drop-out problem in manufacturing, so that manufacturing can be easily facilitated.

In the above embodiment, while the upper flange 34 and the clearance hole 39 each have elliptical shapes, they may be of other shapes as long as the shapes are other than circular as in the related art. Accordingly, their shape can be modified as mentioned below.

Figure 4:
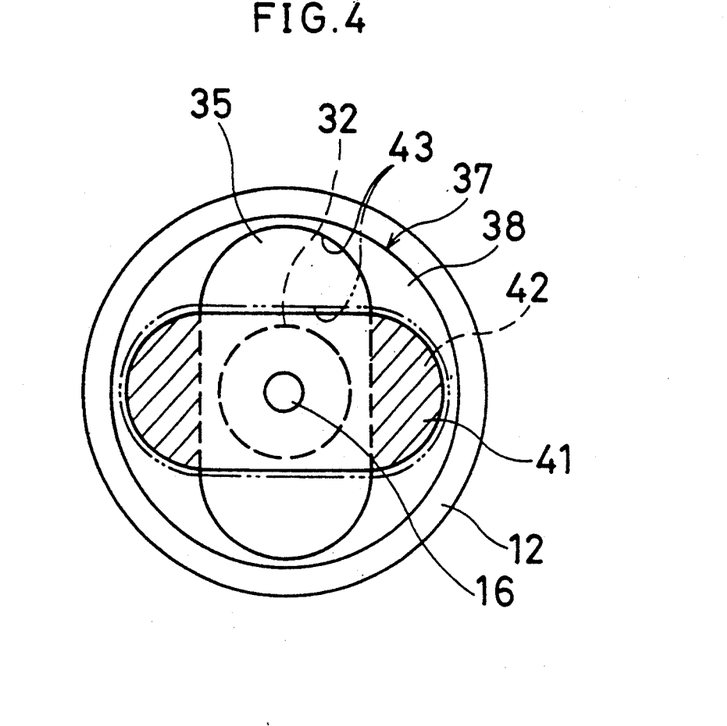
FIG. 4 is a plan view showing a first modification of a first embodiment of an engine mount of the invention, provided with hatching for clarity.
Figure 5:
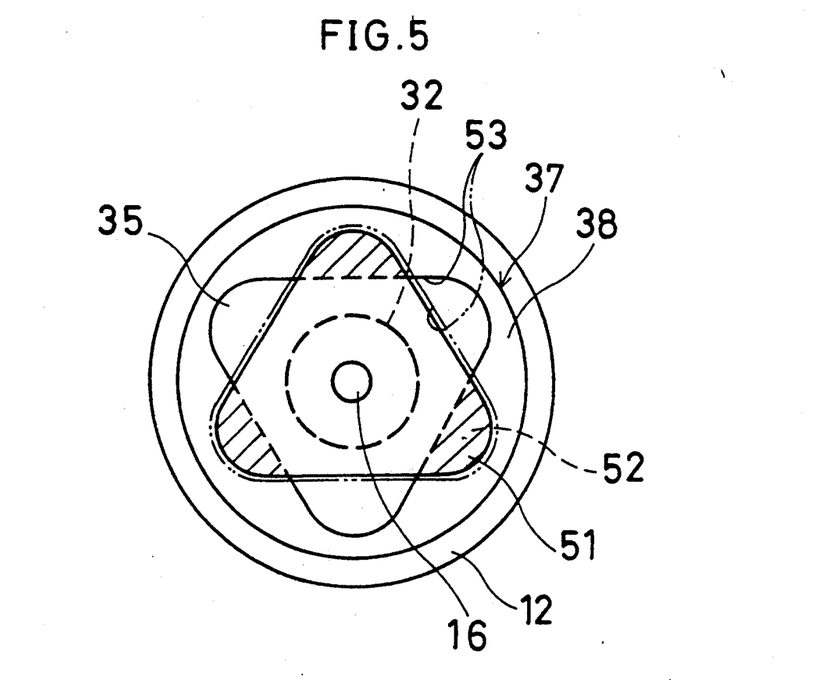
FIG. 5 is a plan view showing a second modification of a first embodiment of an engine mount of the invention, provided with hatching for clarity.
Figure 6:
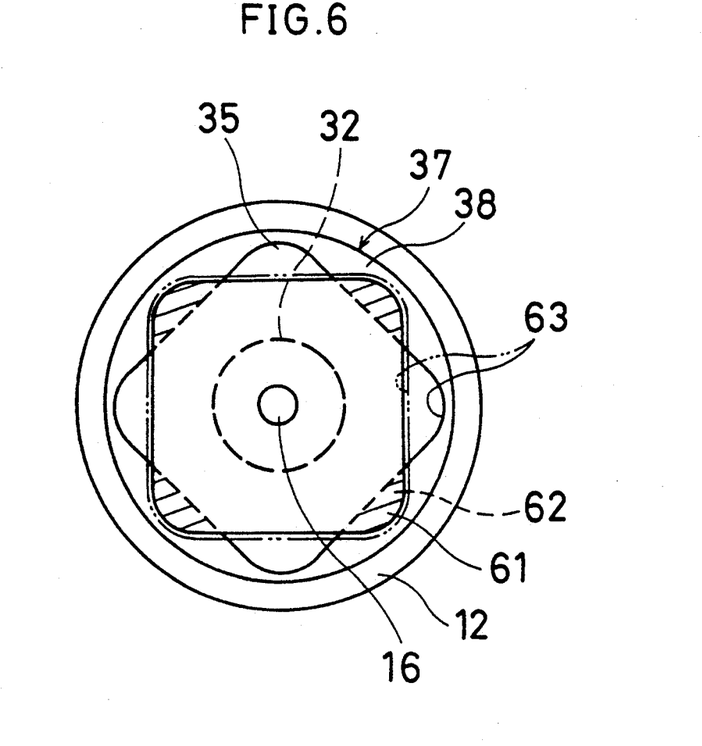
FIG. 6 is a plan view showing a third modification of a first embodiment of an engine mount of the invention, provided with hatching for clarity.

FIGS. 4 to 6 shown plan views of modifications of the first embodiment of the engine mount of the invention.

As shown in FIG. 4, an upper flange 41 of the flanged body 32 is formed into an oval shape. A clearance hole 43 of the upper case 37 is made into an oval of the same outline as the upper flange 41 which is slightly larger than the upper flange 41.

With this structure, the upper case 37 is arranged so that the clearance hole 43 thereof is disposed at a position, shown by the two-dot chain line in FIG. 4, corresponding to the upper flange 41. From that position, the upper case 37 is horizontally rotated 90 degrees as shown by the old line in FIG. 4. Thus, the stopping section 38 is faced to the upper support 42 at its two semicircular portions shown by hatching, thereby functioning as a stopper.

As shown in FIG. 5, an upper flange 51 of the flanged body 32 and a clearance hole 53 of the upper case 37 may be shaped into a triangle with rounded corners. In this case, the upper case 37 is rotated 60 degrees after its disposition, so that the stopping section 38 and an upper support 52 overlap each other at three semicircular portions as shown by hatching.

As shown in FIG. 6, an upper flange 61 of the flanged body 32 and a clearance hole 63 of the upper case 37 may be quadrangular with rounded corners. In this case, the upper case 37 is rotated 45 degrees after is disposition, so that the stopping section 38 and an upper support 62 are opposed to each other at four semicircular portions as shown by hatching.

In any of the above modifications, since the upper flange 41, 51, 61 and other upper support 42, 52, 62 are made into on body with the flanged body 32, the number of parts an be decreased as compared with the related art, thereby decreasing the number of manufacturing steps and drastically diminishing production costs. Moreover, there is no concern of drop-out of the upper flange 41, 51, 61 and the upper support 42, 52, 62, so that manufacturing can be simplified and easily carried out.

In addition, with the engine mounts shown in FIGS. 5 and 6, the stopping section 38 and the upper support 52, 62 are opposed to each other at three or four portions. Thus, there is an advantage that a position of the upper supports 52, 62 is stabilized on touching the stopping section 38, so that it can function as a stopper without fail.

As mentioned above, if the upper flange 51, 61 and the clearance hole 53, 63 are shaped into a polygon such as a triangle or a quadrangle, the number of the faced portions increases between the stopping section 38 and the upper support 52, 62. However, as clearly shown in FIGS. 4 to 6, an area of the faced potions is accordingly gradually decreased. Thus, there is a limit in a shape of the polygon in view of strength. Preferably, the shape may be restricted to the triangle shown in FIG. 5, the quadrangle shown in FIG. 6, or the like.

Figure 7:
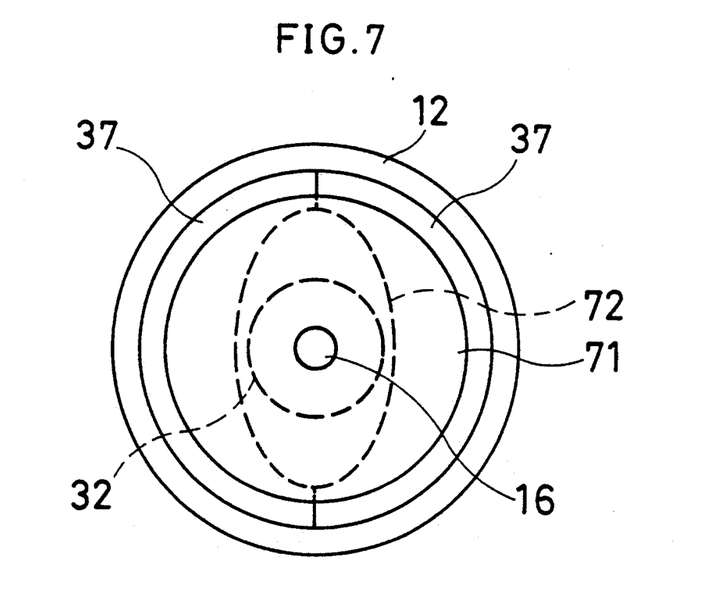
FIG. 7 is a plan view showing a fourth modification of a first embodiment of an engine mount of the invention.

On the other hand, in the above embodiment or its modifications, the upper case 37 is disposed while making the clearance hold 39, 43, 53, 63 correspond to the upper flange 34, 41, 51, 61, and rotated so as to make the stopping section 38 face the upper support 36, 42, 52, 62 and the lower support 35 after the disposition. However, a sliding displacement may be alternately used instead of the rotational displacement. For example, as shown in FIG. 7, the upper case 37 is divided into right and left pieces, and joined so as to cover the rubber body 31. Then, the stopping section 38 is opposed to the upper support 36 and the lower support 35 of the rubber body 31. In case the upper case 37 is slidingly or laterally displaced, it is unnecessary that an upper flange 71 of the flanged body 32 and a clearance hole 72 of the upper case 37 be made into the same shape. Moreover, the clearance hole 72 can be sized smaller than that of the upper flange 71.

Next, a second embodiment of the invention will be described hereafter.

Figure 8:
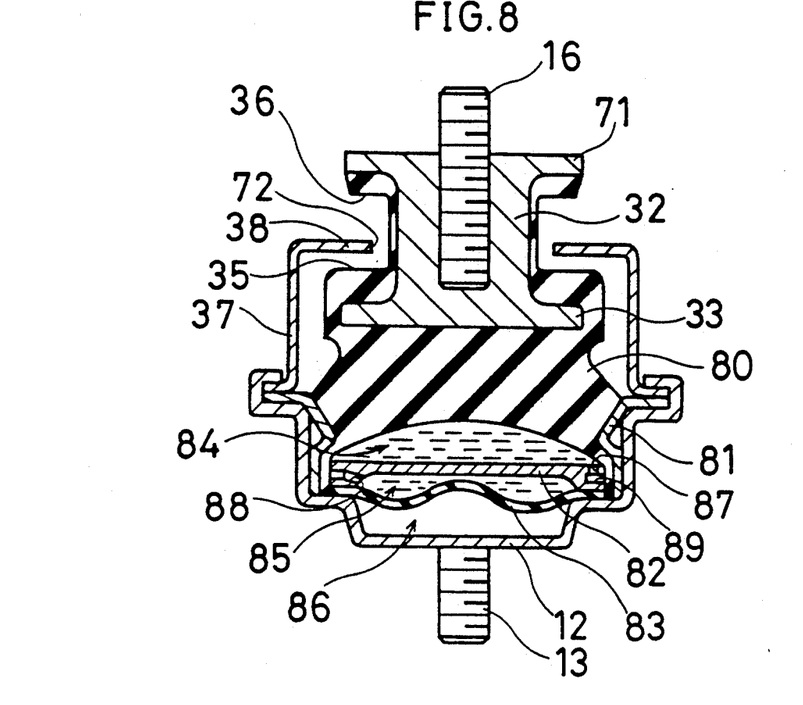
FIG. 8 is a plan view showing a second embodiment of an engine mount of the invention.

FIG. 8 illustrates a cross section of the second embodiment of the engine mount of the invention. This engine mount is constructed as a liquid-charged type, and has the same structure as the first embodiment of the engine mount, other than a working chamber 84, and air chamber 86 and the like. Therefore, the second embodiment will be explained particularly emphasizing those differences.

As shown in the figure, a cylindrical inner case 81 is affixed to an outer periphery of a rubber body 80 in a curing process thereof. The rubber body 80 and the inner case 81 are together accommodated in the lower case 12 and the upper case 37. In the cases 12 and 37, a lower surface of the rubber body 80 defines a hemispherical dented space. A metal circular orifice plate 82 and a diaphragm 83 of a rubber circular plate are arranged inside the dented space in a vertically piled state, disposed on each other. Outer peripheries of the orifice plate 82 and the diaphragm 83 are airtightly held to the rubber body 80. The upper working chamber 84 is defined over the orifice plate 82. A lower working chamber 85 is defined between the orifice plate 82 and the diaphragm 83. The air chamber 85 is defined under the diaphragm 83. A working fluid, preferably of ethylene glycol is filled into the upper working chamber 84 and the lower working chamber 85. Air is charged into the air chamber 86.

A communication hole 87 is formed at one side of the outer circumference of the orifice plate 82 so as to be opened toward the upper working chamber 84. A communication hole 88 is formed at a side opposite to the communication hole 87 of the outer circumference of the orifice plate 82 so as to be opened toward the lower working chamber 85. Both the communication holes 87 and 88 are connected through an orifice passage 89 which is formed along the outer circumference of the orifice plate 82.

The liquid-charged engine mount as constructed above dampens vibration by elastically deforming the rubber 80 when the engine is operating. Moreover, liquid pressure in the upper working chamber 84 is changed in cycles according to the deformation of the rubber body 80. Thus, the working liquid in the working chambers 84 and 85 comes and goes through the orifice passage 89 while expanding and compressing the air in the air chamber 86. Thus, the vibration of a fixed frequency is attenuated by an orifice effect of the orifice passage 89.

In the present embodiment of the liquid-charged engine mount, since the upper flange 34 and the upper support 36 are unified with the rubber body 80 and the flanged body 32 as in the first embodiment, the number of parts can be reduced as compared with the related art, thereby decreasing the number of manufacturing steps, so as to largely diminish production costs. Moreover, there is no concern that the upper flange 34 and the upper support 36 will drop out, so that manufacturing can be easily facilitated.

This invention may be practiced or embodied in still other ways without departing form the spirit and essential character thereof. For instance, while the above embodiments are defined in an engine mount that is used to bear an engine of a vehicle, the invention may be used for a variety of vibrating bodies. For instance, the vibration insulating mount may support various apparatus like machine tools so as to prevent vibration from the apparatus from transmitting to other equipment through the floor.

Moreover, while the elastic body is defined as the rubber body 31, 80 in the above embodiments, any material may alternately be used as long as it can be elastically deformed upon application of vibration from an engine so as to dampen the vibration. Accordingly, the elastic body can be formed, for example, an elastomer of a proper elasticity.

Furthermore, the first and second supports of the above embodiments are practiced into the lower support 35 of the rubber body 31, 80 covering the upper surface of the lower flange 33 of the flanged body 32, and the upper support 36, 42 52, 62 covering the lower surface of the upper flange 34, 41, 51, 61, 71. However, they may be modified as long as they are opposed to the stopping section 38 of the upper case 37 and in contact therewith following the deformation of the rubber body 31, 80. Accordingly, the lower flange 33 and the upper flange 34, 41, 51, 61, 71 of the flanged body 32 may be exposed without any covering of the rubber body 31, 80 so as to directly touch the stopping section 38. However, in case a layer of the rubber body 31, 80 is provided to form the lower support 35 and the upper support 36, 42, 52, 62, it is possible to prevent hammering noises by collision thereof to the metal stopping section 38. Therefore, it is preferable to provide the covering of the rubber body 31, 80, especially in case of being defined in an engine mount for vehicles that require noise reduction, as in the above embodiments.

On the other hand, while the stopper is defined by the upper case 37 which accommodates the rubber body 31, 80 in cooperation with the lower case 12, other structure may alternately be adopted as long as it carries the stopping section 38 and is able to be fixed to the rubber body 31, 80 directly or indirectly. Accordingly, it is not always necessary to give the stopper a function as a case.

The preferred embodiments described herein are therefore illustrative and not restrictive, the scope of the invention being indicated in the appended claims and all variations which come within the meaning of the claims are intended to be embraced therein.

What is claimed is:

1. A vibration insulating mount comprising:
    an elastic body which is elastically deformable upon application of vibration from a vibrating body;
    a first support provided at one portion of the elastic body;
    a second support integrally formed with said elastic body and being disposed at a fixed distance from the first support so as to define a space between the first and second supports, and
    a stopper arranged at another portion of the elastic body, the stopper having a stopping section at one end thereof disposed within the space defined between the first support and the second support, the stopping section being structured so that, in assembly of the insulating mount, the stopping section is capable of being moved from a first position in relation to the second support without interfering with the second support, to a final position so that after assembly of the insulating mount the stopping section is contacted with one of the first support and the second support in accordance with a predetermined degree of elastic deformation of the elastic body so as to regulate further elastic deformation of the elastic body.

2. A vibration insulating mount according to claim 1, further comprising a flanged body having a pair of flanges integrally formed at opposite ends thereof, the first support and the second support being defined on opposing surfaces of the flanges so as to define the space which circumferentially extends between the first support and the second support, the stopping section being formed into a plate projecting into the space.

3. A vibration insulating mount according to claim 2, wherein opposing surfaces of the first support and the second support of the flanged body are covered with an elastic material.

4. A vibration insulating mount according to claim 3, wherein the elastic material is molded so as to be continuous from the elastic body to the first support and the second support of the flanged body.

5. A vibration insulating mount according to claim 2, wherein the stopper has a portion for fixing the stopping section to the elastic body, the portion of the stopper being slidingly fitted to the elastic body so that the stopper is fixed to the elastic body while the stopping section is overlapped with the first support and the second support.

6. A vibration insulating mount according to claim 5, wherein the stopper is laterally divided into two pieces, the pieces being joined to each other at lateral sides of the elastic body, thereby being fixed to the elastic body.

7. A vibration insulating mount according to claim 1, wherein the second support is a plate member, the stopping section is a plate having a clearance hole, and the clearance hole is substantially of a same shape as the second support and larger than the second support, whereby, in a step of assembling the insulating mount, the clearance hole corresponds to the second support so as to permit the second support to pass through the clearance hole of the stopping section, and, after said assembling step, the stopping section is circumferentially rotated relative to the second support so as to fix the stopper to the elastic body while the clearance hold and the second support are overlapped.

8. A vibration insulating mount according to claim 7, wherein the second support and the clearance hole of the stopping section have a substantially elliptical shape.

9. A vibration insulating mount according to claim 7, wherein the second support and the clearance hole of the stopping section have a substantially polygonal shape.

10. A vibration insulating mount according to claim 9, wherein the second support and the clearance hole of the stopping section have a substantially triangular shape.

11. A vibration insulating mount according to claim 9, wherein said polygonal shape is substantially quadrangular.

12. A vibration insulating mount according to claim 1, further comprising damping means operatively connected with the elastic body so as to attenuate vibration of the elastic body.

13. A vibration insulating mount according to claim 12, wherein the damping means includes a diaphragm enclosing a surface of the elastic body away from the first support and the second support so as to define a sealed space therein, a working liquid being filled into the sealed space, an orifice plate dividing the sealed space, the orifice plate having an orifice passage communicating the divided sealed spaces so as to circulate the working liquid between the divided sealed spaces.

14. A vibration insulating mount according to claim 13, further comprising a case enclosing an outer surface of the diaphragm so as to define an air chamber.

15. A method of assembling a vibration insulating mount comprising the steps of:
    providing an elastic body which is elastically deformable upon application of vibration from a vibrating body;
    embedding a lower flange portion of a flanged body within an end portion of said elastic body so as to form a first support, said flanged body including an upper flange portion disposed opposite said lower flange portion so as to form a second support,
    molding elastic material so as to be continuous from the elastic body to the first support and the second support;
    providing a stopper having a clearance hole therein;
    passing the stopper over the flanged body so that the flanged body passes through the clearance hole;
    rotating the stopper in relation to said flanged body; and
    fixing the stopper to the elastic body so that a portion of said stopper is disposed between the first support the and second support so that said supports may contact said stopper portion upon elastic deformation of the elastic body.

* * * * *